United States Patent [19]

Foster et al.

[11] Patent Number: 5,278,979
[45] Date of Patent: Jan. 11, 1994

[54] VERSION MANAGEMENT SYSTEM USING POINTERS SHARED BY A PLURALITY OF VERSIONS FOR INDICATING ACTIVE LINES OF A VERSION

[75] Inventors: Richard D. Foster, Poughkeepsie, N.Y.; Ellory K. McCaulley, Boulder, Colo.

[73] Assignee: International Businesss Machines Corp., Armonk, N.Y.

[21] Appl. No.: 630,928

[22] Filed: Nov. 20, 1990

[51] Int. Cl.⁵ .............................................. G06F 7/06
[52] U.S. Cl. .............................. 395/600; 364/222.81; 364/222.82; 364/222.9; 364/DIG. 1
[58] Field of Search ................ 395/600, 100, 500, 650

[56] References Cited

U.S. PATENT DOCUMENTS

| | | | |
|---|---|---|---|
| 4,558,413 | 12/1985 | Schmidt | 395/600 |
| 4,714,992 | 12/1987 | Gladney | 395/600 |
| 4,809,170 | 2/1989 | Leblang | 395/700 |
| 4,912,637 | 3/1990 | Sheedy | 395/600 |
| 5,133,066 | 7/1992 | Hansen | 395/600 |

OTHER PUBLICATIONS by Tichy, "RCS–A System for Version Control" in book Software–Practice and Experience vol. 15(7), pp. 637–654 (Jul. 1985).

Primary Examiner—Thomas C. Lee
Assistant Examiner—Jennifer M. Orzech
Attorney, Agent, or Firm—William B. Porter

[57] ABSTRACT

A single entity contains source lines, being operated on by one or more end users. Within the same entity are entity version and level control data. Individual source lines contain version-related identification variables. After each version or level update by a user, a comparison is made between new and old versions; source line identification variables are modified, and new source lines are added; dependent version information is stored in the entity, and control data is updated. Subsequent retrievals of a version are responsive to the dependent version information, and produce indications of any changes that had been made to dependent versions.

7 Claims, 14 Drawing Sheets

FIG. 15

```
ECD    PARTA HILINE=3          (ENTITY CONTROL DATA)

VCD    VER.A                   (VERSION CONTROL DATA)
LCD    TS1=0001,0003           (LEVEL CONTROL DATA)

VCD    VER.B
LCD    TS1=0001,0002,0003

VCD    VER.C
LCD    TS1=0001,0002
_ _ _ _ _ _ _ _ _ _ _ _ _ _ _ _ _ _ _ _ _ _ _ _ _ _ _

0001   LINE A ..................................
0001   LINE B ..................................
0001   LINE C ..................................
0002   LINE X ..................................
0003   LINE D ....(DELETED LINE D)........
0001   LINE E ..................................
```

FIG. 16

```
ECD    PARTA HILINE=5          (ENTITY CONTROL DATA)

VCD    VER.A                   (VERSION CONTROL DATA)
LCD    TS1=0001,0003,0004      (LEVEL CONTROL DATA)

VCD    VER.B
LCD    TS1=0001,0002,0003,0004

VCD    VER.C
LCD    TS1=0001,0002,0004,TS2=0001,0002,0005

_ _ _ _ _ _ _ _ _ _ _ _ _ _ _ _ _ _ _ _ _ _ _ _ _ _ _

0001   LINE A ..................................
0004   LINE B ..................................
0005   LINE BN....(CHANGED LINE B)......
0001   LINE C ..................................
0002   LINE X ..................................
0003   LINE D ..................................
0001   LINE E ..................................
```

VERSION MANAGEMENT SYSTEM USING POINTERS SHARED BY A PLURALITY OF VERSIONS FOR INDICATING ACTIVE LINES OF A VERSION

BACKGROUND OF THE INVENTION

1. Field of the Invention

The present invention relates to the field of software development tools. More particularly, it relates to a system for storing multiple versions of program source data in a single entity, permitting modification to the versions of different accessors.

2. Background Art

Bulk Data Storage Libraries typically serve as large repositories of related data such as source code for a software development project or book versions for a publications organization.

Typically, inherent in these applications is the requirement that multiple versions of source data be maintained and that the versioning technology supports an easily understood, intuitive, view of the data.

Current bulk data storage technologies enable the storage of and retrieval of versions of data via a number of methods:

Full Copy versioning is the most basic implementation of maintaining multiple versions of data. Maintaining multiple full copies of each version of a given source object requires a great deal of storage media (DASD) and is typically applicable only in small bulk data applications where DASD usage is not a problem.

Delta versioning enables multiple changes to be made to a common base and also enables more efficient utilization of DASD. Delta versioning is usually implemented via the creation of multiple small files which represent only the changes (deltas) to a given base version. Delta versioning however, requires the use of unique merge processes in order to initially construct and subsequently reconstruct each given version from the potentially large number of multiple files which make up that version. In addition, the dependency relationships between the multiple files is typically maintained in a separate control file (which must be separately accessed each time a version of the data is to be stored or retrieved). Delta files also require some external mechanism to uniquely identify the line that is to be changed. There are basically two kinds of delta schemes: those in which the full source copy is the oldest version and the deltas represent newer versions; and those in which the full source copy is the newest version and the deltas represent older versions. The former type is sometimes called "forward" deltas whereas the latter are called "reverse" deltas.

Some versioning schemes have been developed which attach line identifiers to each record in a file in order to uniquely identify each line which may be used in a merge operation. However, implementations of this methodology may require the creation and maintenance of multiple separate files (one for each version) in which merge control information is created and maintained. Or Versions Dependencies may not be recordable, or trackable.

Todays information processing applications require greatly enhanced bulk data version control capability coupled with enhanced capability to effectively utilize that data.

Keys areas which must be accessed by these technologies include the following:

The ability to access, control, and modify multiple versions of source data concurrently.

The ability to maintain a history of incremental changes to the source and to uniquely identify the historical order in which changes occur.

The ability to detect, record, and provide notification of changes to a related version.

The ability to maintain control data and source data, and application-defined data in a more intuitive, controlled, and efficient manner.

The ability to minimize the use of external storage (DASD) in facilitating massive data storage requirements.

SUMMARY OF THE INVENTION

This invention provides a new Bulk Data Storage Technology called Single Entity Versioning (SEV).

Using a unique control structure, SEV efficiently enables the storage of multiple versions of source data within the confines of a single entity. SEV accomplishes this via the creation and maintenance of unique version identification and control data which is combined with the source in a fully encapsulated form.

It is an object of this invention to enable the derivation of new source versions from specified existing versions and support the notion of identifying and recording dependent (or related) versions.

It is a further object of this invention to provide a complete history of incremental source change activity identified in the historical order in which the changes occur.

It is another object of this invention to provide means for identifying dependent (or related) versions of bulk data.

It is a further object of this invention to provide the capability of detecting, recording, and providing notification of underlying or related version changes.

It is another object of this invention to provide the capability of recording application defined data within the entity at any specified version level.

It is another object of this invention to provide a serialized access to specified version levels within a source data entity.

BRIEF DESCRIPTION OF THE DRAWINGS

FIG. 15 illustrates a SEV entity upon storing an example version C, change 1.

FIG. 16 illustrates a SEV entity upon storing an example version C, change 2.

DESCRIPTION OF THE PREFERRED EMBODIMENT

Figure 1:
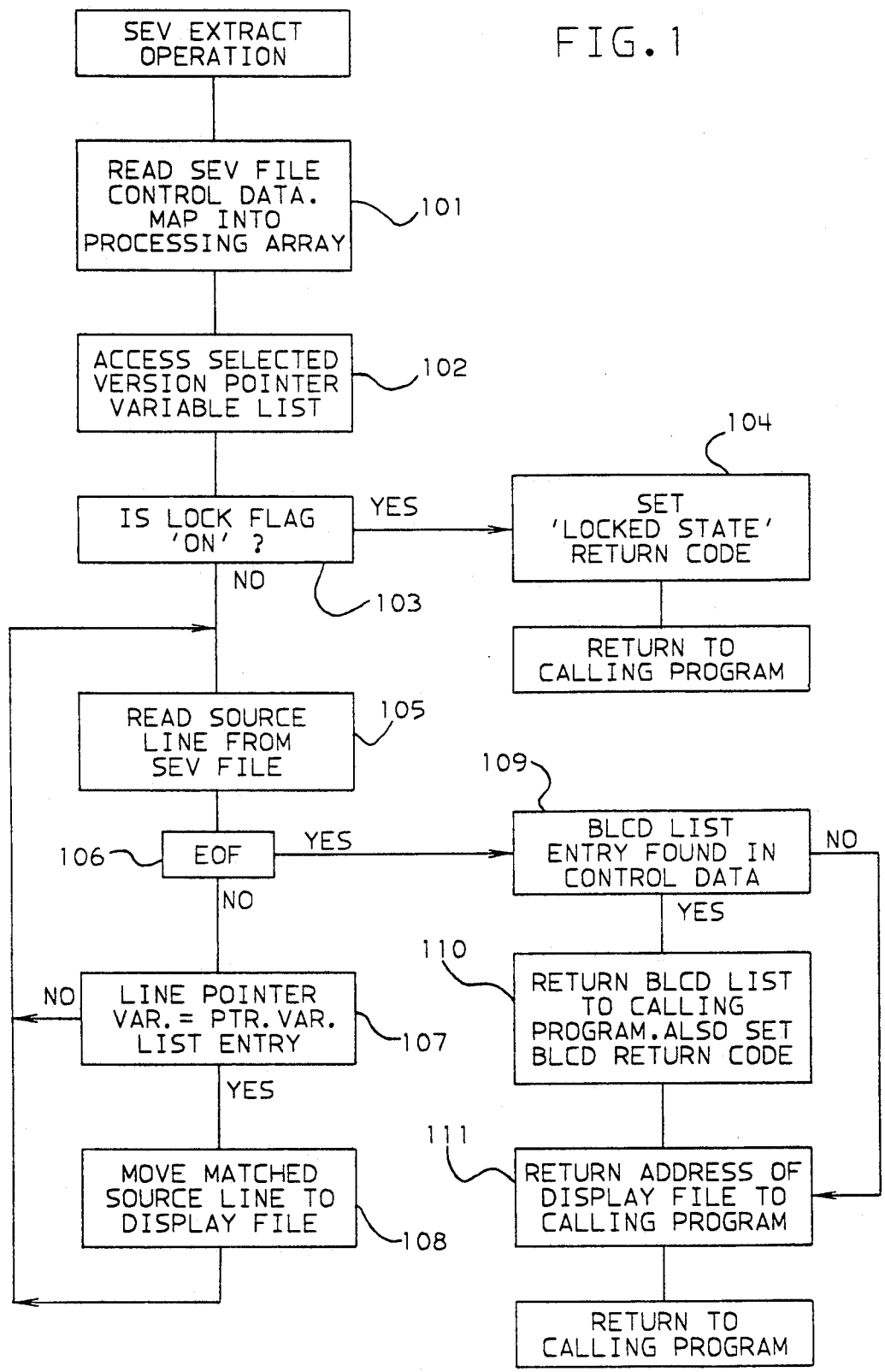
FIG. 1 is a flowchart illustrating EXTRACT processing.

From an operational view, SEV is designed to reside 'within' a using application. In the preferred embodiment, SEV Functions are invoked by the using application via internal program calls. The following callable functions perform the key function as described:

Extract—Extract a specified version from a SEV file and place it in a display file (from which it may be edited).
  and optionally—extract selected User (application-defined) data from a SEV file and place it in a specified receiving file.

Store—Compares the modified file against the prior level file, detects the changes, and builds the new SEV file to be stored.
  and optionally—place User data taken from a specified user file into the SEV file to be stored.

Erase—Erases a specified version or modification level from the SEV file.

BLCD Reset—Delete a specified BLCD List entry (which was constructed at the time a file was stored).

LOCKON/LOCKOFF—Sets the on/off "state" of the SEV lock flag in either the VCD or LCD control data areas of the SEV entity. The lock flag is examined by the SEV Extract operation. If the lock flag is "on", the selected version or level will not be extracted, and an appropriate return code is returned to the application.

PUTDATA—copies application-defined data from a specified input file, and records it within the SEV entity at either the ECD, VCD, or LCD control data areas.

GETDATA—retrieves application defined data from either the ECD, VCD or LCD control data areas in the SEV entity, and writes the data to a specified output file.

By way of introduction, the following definitions apply to terms used in this embodiment:

Bulk Data, Source data, or source—The type of data which is typically contained in large files, i.e. program source code, textual data for a book, etc.

Derived Version—References a version of source which is initially derived from a prior version. This is sometimes referred to as a version of source 'based on' a prior version.

Underlying/related versions—Source data from which higher versions are derived.

Control Data—Typically data entities which are used to reference or contain processing information about other data.

Timestamp(s)—The use of timestamps is a common practice in may process applications. It is typically used to attach a 'date and/or time' specification to an event so that event can be identified by the historical sequence in which it occurred.

Calling/Using Application—SEV is designed to operate as a set of functions which are callable by an application program. SEV functions typically return the SEV output file, data files, and various operational information as defined by the function. All SEV functions return 'success/fail' indicators at the completion of each operation.

Edited Text—A reference to a source file which is typically created, viewed, and modified by an end user (i.e. a programmer or a book editor).

Versions—Versions of a source file typically represent iterative changes to a file. New versions of a source file are often derived from a prior version of that file. Each version within SEV may consist of one or more "modification levels" (instances of a version with different timestamps).

SEV file—A SEV file is the working file created and maintained by various functions incorporated in the SEV technology. The SEV file is the Single Entity where multiple versions of source and the control data required to operate on that source is retained.

The SEV Technology utilizes a number of common programming techniques in its preferred embodiment. These techniques are well known and accepted within the professional programming community.

Input/Output processing—Standard I/0 processing is used for all SEV read and write operations. Included is standard I/0 error checking and handling and end of file (EOF) processing.

External Storage Media—The preferred embodiment assumes the use of Direct Access Storage Devices (DASD) as the storage medium. DASD is the common storage medium used in bulk storage (library) applications.

Storage Mapping—This programming technique is used to 'map' externally stored data when read into storage for processing. With storage mapping, specific data may be tagged by defined variable names. This technique enables SEV Control Data to be referenced and processed in a consistent manner.

Array Processing—This programming technique is used to scan data which has been mapped into storage. SEV utilizes standard array processing techniques to search for version pointers, pointer variable list data, control data for SEV built-in functions, etc.

The concept of Pointer Variable Lists is a key methodology which facilitates SEV version processing.

Figure 10:
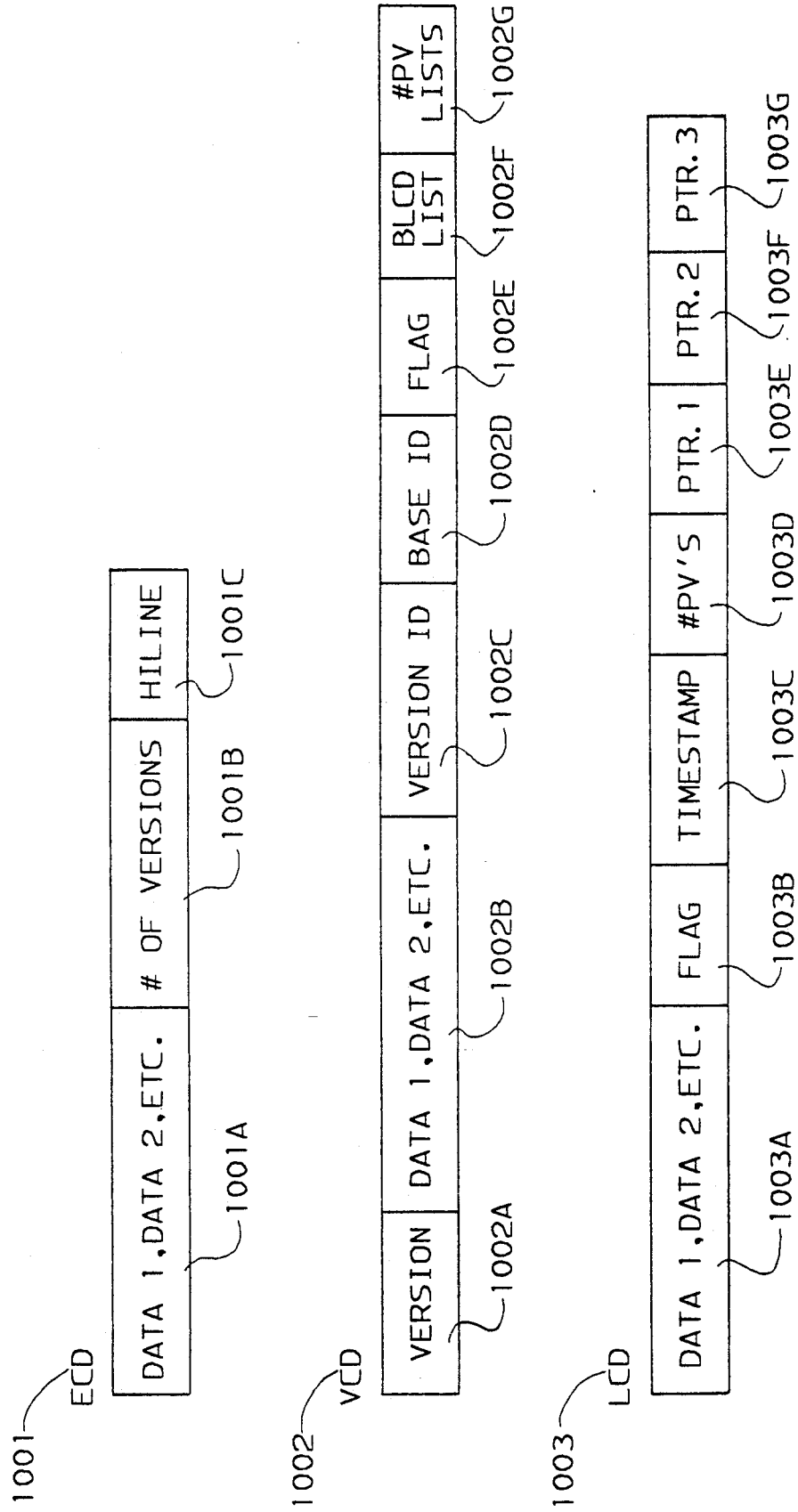
FIG. 10 is a control block diagram illustrating the ECD, VCD and LCD structures.

Each time a new source version is created, a new Pointer Variable List is created. Each of these lists contains a sequence of line pointer variables (i.e., line numbers) which collectively constitute a unique version of the source. SEV Pointer Variable Lists are maintained in the Level Control Data (LCD) element. (See FIG. 10.)

When a new modification level is created within an already existing version specification, a new pointer variable list is created and appended to those which already exist in that versions LCD element. This feature provides the capability of uniquely identifying each incremental modification level of the source so that it may be saved and subsequently accessed.

A key feature of SEV uniquely identifies each version of a source object stored in a SEV file. By attaching a timestamp to each Pointer Variable List, SEV enables each version to be uniquely identified in the historical order in which it was created.

The following is a description of the SEV Control Line constructs.

The basic SEV Control Line structure consists of three Control Data Elements:

Entity Control Data (ECD)—Identifies Entity level data, the HILINE value—i.e., the highest currently assigned line number and optional application defined data. There is only one ECD element per SEV entity.

Version Control Data (VCD)—Identifies Version level data, the version/level specification, SEV Base Level Change Detection List, SEV Built In function control variables, and optional application defined data.

Level Control Data (LCD)—Contains the SEV Timestamped Pointer Variable Lists and optional application defined data. Each timestamp in the LCD element corresponds to a specific modification level - or instance of that version.

SEV 'ECD' control data (FIG. 10 at 1001) is always the first element in a source entity. There is only one ECD Control Data element per entity. ECD data is followed by additional control data elements depending on the number of versions of the source. The ECD element is used to record entity level SEV control data, it is also used to record application defined data at the entity level (i.e. data that applies to the entity as a whole). The ECD element contains:

a) Application-defined data (1001A)
b) Number of versions in this SEV entity (1001B)
c) Current HILINE identifier (1001C).

SEV 'VCD' control data (FIG. 10 at 1002) is always the first of a pair of control data elements (coupled with LCD data) and is used to record unique version control data. The VCD element is also used to record version level application defined data. The VCD element contains:

a) Version identification (1002A)
b) Application-defined data (1002B)
c) Version identifier (1002C)
d) Base identifier (1002D)
e) Lock Flag (1002E)
f) BLCD entry list (1002F)
g) Number of Pointer Variable lists in the following LCD element (1002G).

SEV 'LCD' control data (FIG. 10 at 1003) is always the second of a pair of control data elements (coupled with VCD data) and is used to record the SEV Timestamped Pointer Variables Lists. More than one Timestamped Pointer Variable List may exist in an LCD element. This occurs when multiple changes are made to a given version. The actual Timestamped Pointer Variable List(s) are made up of the timestamp (1003C), the number of pointer variables value (1003D) and the pointer variables themselves (from one to many entries) (1003E, F, G). The LCD element contains:

a) Application-defined data (1003A)
b) Lock Flag (1003B)
c) Timestamp value (1003C)
d) Number of Pointer Variables in the following list (here, 3 are illustrated) (1003D)
e) Pointer variable 1 (1003E)
f) Pointer variable 2 (1003F)
g) Pointer variable 3 (1003G).

In a program development environment, one of the most important factors when developing or maintaining multiple levels of dependent source code is the specific knowledge that an underlying (or related) version of the source has been changed. The assumption is that changes to a lower level of source should be forward fitted into the higher level version of the source in order to correctly maintain an orderly development environment. Without this knowledge, there is always the exposure that certain lower level changes (which should be included in the higher version) might go undetected and produce incorrect results. In an environment where multiple versions of source are being altered concurrently by multiple persons, this situation becomes extremely difficult to control.

Base Level Change Detection (BLCD) is a built in function of SEV which automatically detects and records the fact that a dependent version of the source has been changed. There are three basic steps to this process which takes place at the time the version is to be stored.

1. Determine that a version of the source has been changed (per the file compare process).
2. Scan the SEV VCD Control Data to identify any dependent versions (determined by the Base Identifier specification).
3. Record the identity of the changed version in the BLCD list(s) of each version found.

A subsequent access to any higher level version will result in an automatic notification that a base level change was detected and which specific version was actually changed. This information is passed back to the calling application.

Base Level Change Detection utilizes the Version Identifier and the Base Identifier fields in the VCD Control Data elements to determine the chain of dependent versions to be examined.

Note: The Version Identifier is simply a 'next sequential' value assigned at the time a new version is created. The Base Identifier points to an underlying/related Version identifier which is specified at the time the new version is created.

For example:

|   | ECD | PARTA......... |
|---|---|---|
|   |   | A    B    C |
| 1) | VCD | VER.A,01,00,00,00 |
|   | LCD | TS1=0001,0002,TS2=0001,0002,0003,0005 |
|   |   | A    B    C |
| 2) | VCD | VER.B,02,01,00,01TS2 |
|   | LCD | TS1=0001,0002,0003 |
|   |   | A    B    C |
| 3) | VCD | VER.C,03,02,00,01TS2 |
|   | LCD | TS1=0001,0002,0004 |

In this example, we will assume that three versions of PARTA existed (VER.A, VER.B, and VER.C) and VER.A was changed. Note the second Timestamped Pointer Variable List (indicating a second modification level of VER.A).

1. Referencing the first VCD/LCD Control Data set (VER.A):

The Version ID(A) is '01' indicating that this is the first occurrence of this source.

The Dependency ID(B) is '00', indicating that this level is not dependent on any other level.

Because the Base ID(B) is '00', the BLCD internal list for VER.A(C) would indicate that there are no related dependent levels.

2. Referencing the second VCD/LCD Control Data set (VER.B):

The Version ID(A) is '02' indicating that this is the second occurrence of this source.

The Base ID(B) is '01' indicating that this version is based on the prior Version ID '01'.

The BLCD list for VER.B(C) would contain the Version ID '01' (and the proper attached Timestamp 'TS2') upon which VER.B is dependent.

3. Referencing the third VCD/LCD Control Data Set (VER.C):

The Version ID(A) is '03' indicating that this is the third occurrence of this source.

The Base ID(B) is '02' indicating that this version is based on the prior Version ID '02' (which was based, in turn, on the earlier Version ID '01').

The BLCD list for VER.C(C) would contain the Version ID '01' (and the proper attached Timestamp 'TS2') upon which VER.C is dependent (through VER.B).

Note: BLCD Lists may contain multiple entries depending on the number of 'underlying' changes made. The timestamp attached to each Version ID provides a specific reference to the version/modification level which was changed. Selected BLCD entries may be deleted under application control via a BLCD reset function. Typically, the BLCD reset function would be used to 'turn off' future notification after an end user action has been taken (such as resolving the underlying changes).

Logic Flow

The SEV Extract Operation:

The SEV Display Entity Build operation (see FIG. 1) is invoked when the application program is instructed to retrieve a version of a source entity from a repository. Typically, the retrieved source is reviewed, changed, and then returned to the repository.

At 101, selected SEV Entity (input file) is read from the repository and mapped into a processing array. At 102, the VCD Control Data Elements are scanned to find the selected Version ID and its corresponding Pointer Variable List. At 103, the lock flag state is examined: if "on", the "locked state" return code is set 104, and return is made to the calling program; if "off", each source line is then read 105, from the SEV input file until the end of file is detected 106. As each source line is read, the attached Line ID is compared 107 against each entry in the Pointer Variable list. Each Line ID which matches an entry in the Pointer Variable List is written 108 to the Display output file. When the end of file is reached 106 in the SEV input file, the Base Level Change Detection (BLCD) list is examined 109. If BLCD list entries are found 110, the list of entries and a BLCD return code indicator is set to be returned to the calling program. The address of the newly created Display file and the BLCD list, if any, is returned to the calling program 111 with the proper return code indicator.

Figure 2A:
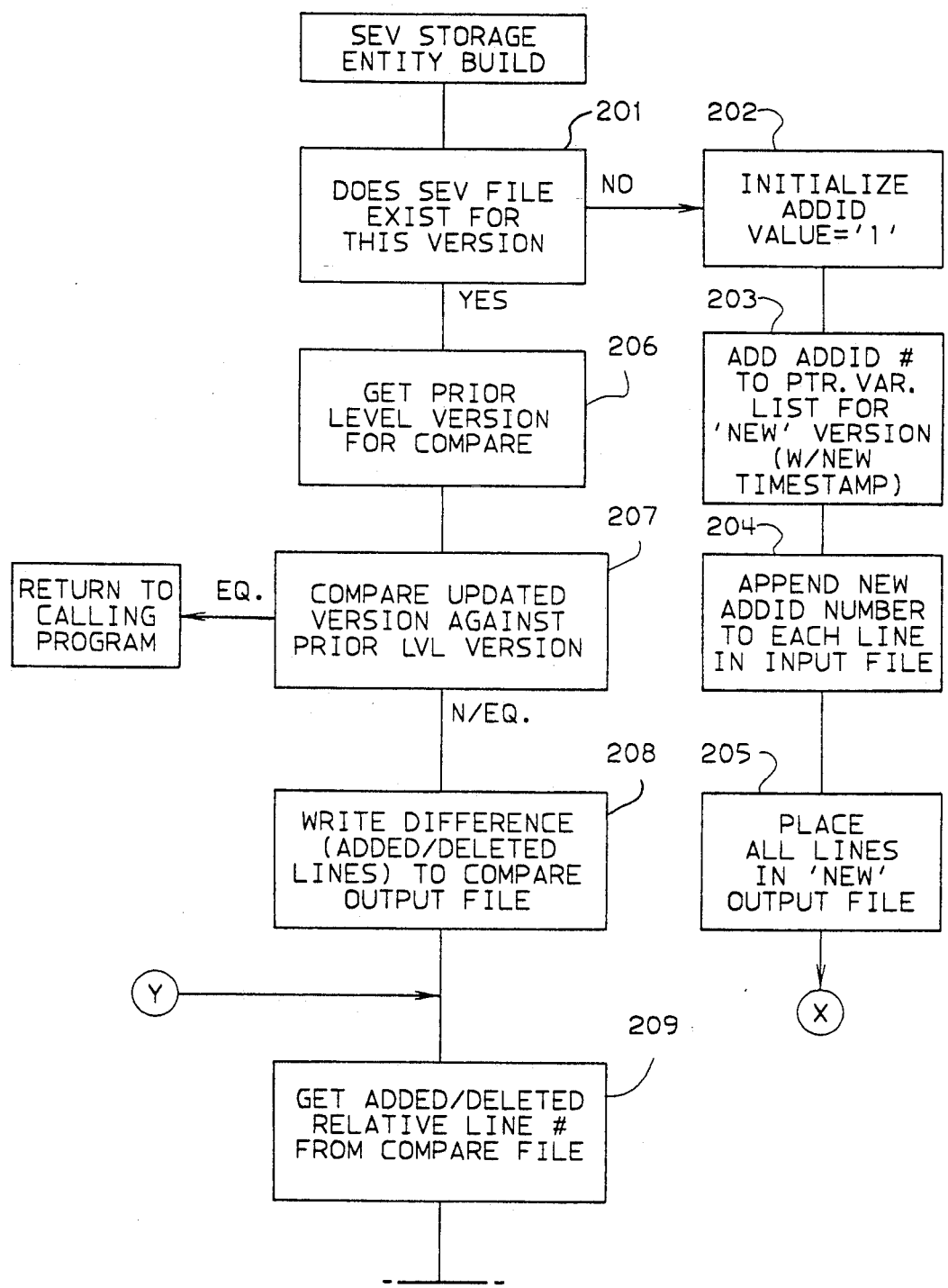
FIGS. 2A and 2B are, respectively, top and bottom portions of a flowchart illustrating STORE processing.
Figure 2B:
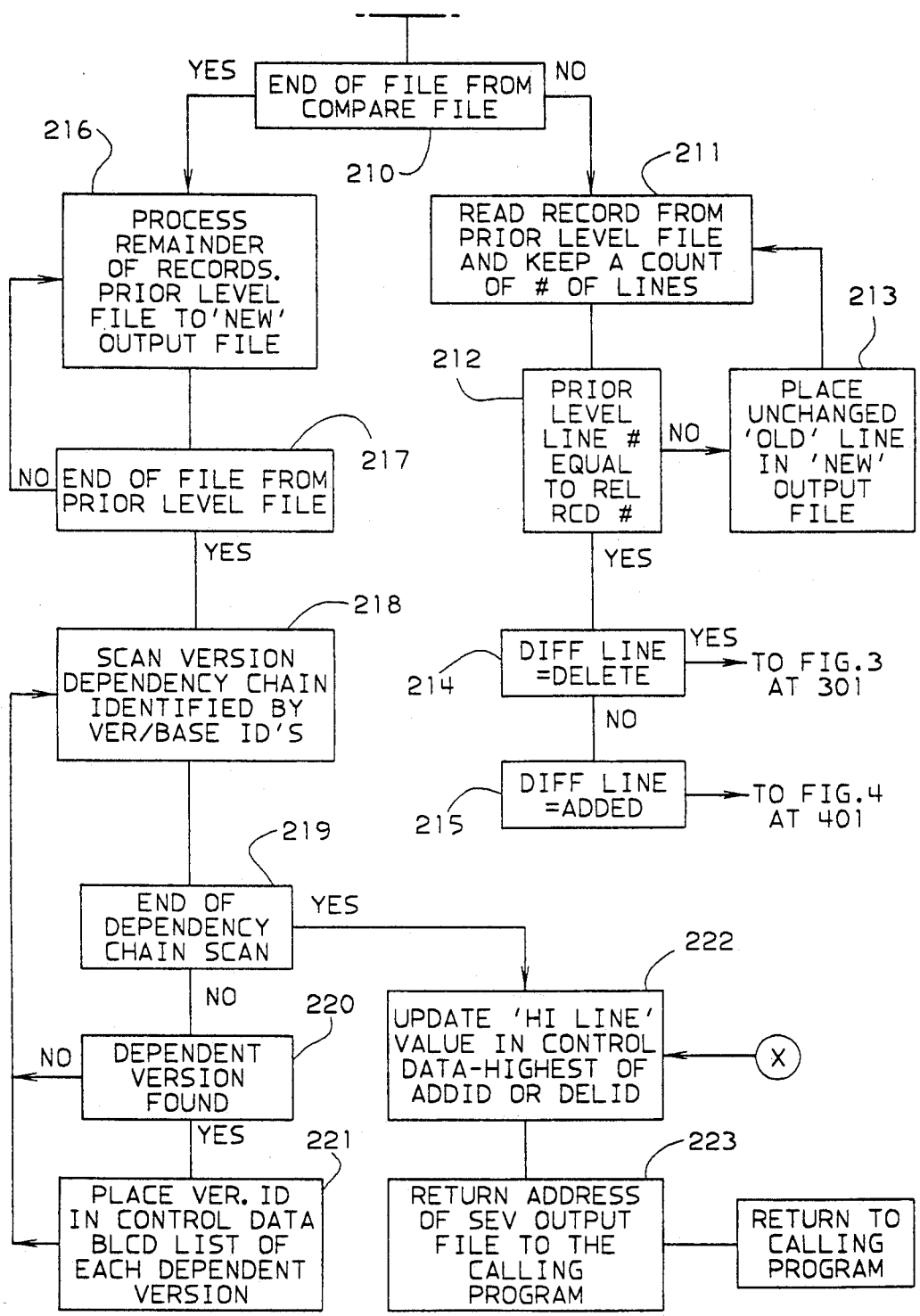

The SEV Store Operation:

The SEV Storage Entity Build operation (see FIGS. 2A and 2B) is invoked when the application program is instructed to return a changed file to a repository. Most of the key SEV algorithms and processing logic designed to create and maintain a SEV entity are executed at this time.

At 201, a test is made if a SEV file already exists for the specified version or if a new SEV entity should be created. If this is a new SEV entity, the initial value '1' is used 202 as the first pointer variable. The value '1' is assigned to the ADDID variable where it is to be used to tag each line in the source. Next, 203, the ADDID variable is placed in the new Timestamped Pointer Variable List created for this version. The ADDID variable is appended 204 to the beginning of each line in the input file. Each line is placed 205 in the newly created SEV output file, and return is made to the calling program.

If the test at 201 showed that this SEV entity already exists, the prior level version is extracted 206 for a comparison. This comparison compares the version of the file to be stored against the prior level of that file 207. If the files are the same, return is made to the caller. If not, 208, the compare program writes the results of the compare to a compare output file. (Details are provided below under "Compare Program".) The compare output file is read 209 to retrieve the relative record number and the actual changed line data. As long as the compare file is not at an end 210, the prior level file is read 211 and sequential count of the number of lines read is kept. This line count enables tracking of the relative position in the file. The relative record number retrieved from the compare program output file is compared 212 against the relative record number of the prior level file. If the compare is not equal, this line (read from the prior level file) is unchanged and is copied directly to the SEV output file 213. If the compare is equal, this line (read from the prior level file) matches a line identified in the compare program output as either an added or deleted line.

Figure 3:
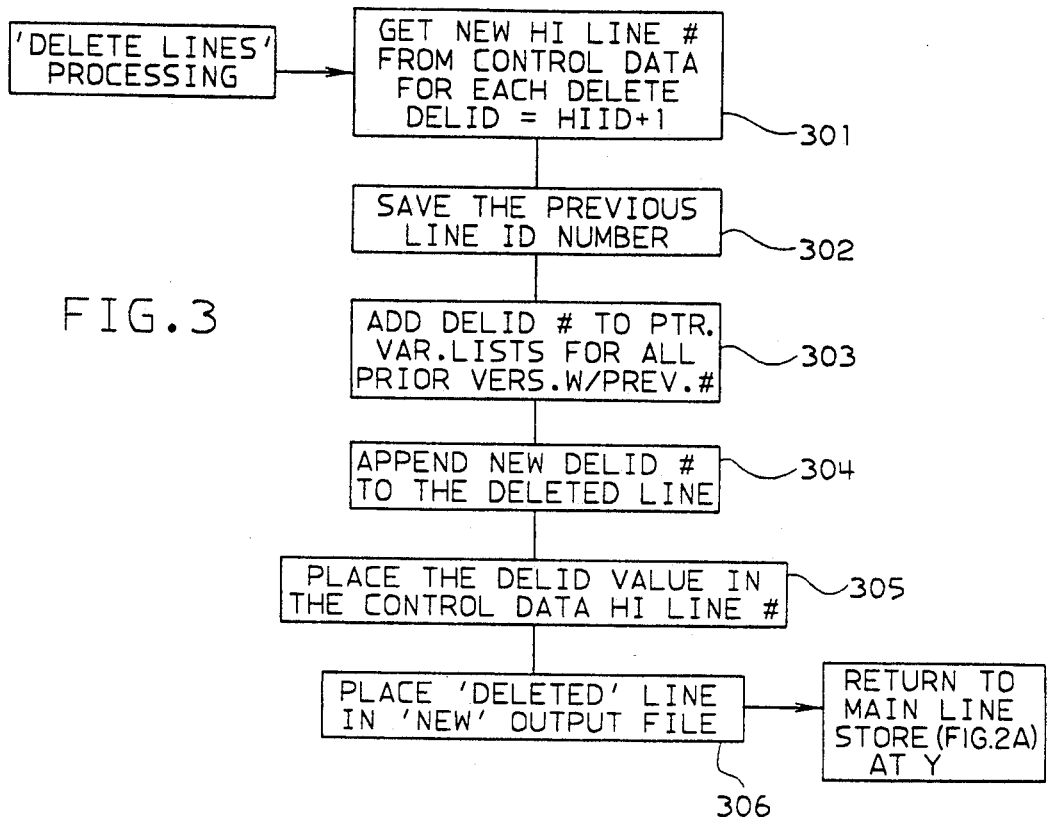
FIG. 3 is a flowchart illustrating DELETE LINES processing.

If the compare data 214 indicates a 'Deleted' line, processing is performed as indicated in FIG. 3. First, 301, a new HILINE number is retrieved from the HILINE value in the ECD Control Data Element where it is maintained. The HILINE value always reflects the 'last used' Line ID number. The HILINE number is incremented by one, and this incremented number is placed in the DELID variable. The Line ID as it exist on the line identified by the compare program is saved 302. This Line ID will be used to identify and properly update prior references to this deleted line which may exist in prior versions. All the Pointer Variable Lists in the SEV Control data are scanned 303 to find any references to the deleted line. When a matching pointer variable is found, the new DELID variable is appended to that pointer variable list. This action assures that the 'deleted' line being processed continues to be properly referenced by all prior versions. The DELID variable is then appended 304 to the beginning of the source line identified in the compare program output. The DELID value is then placed 305 in the HILINE value in the SEV Control Data. If there are multiple 'deleted' lines identified in the compare program output file, each of the deleted lines will receive a unique DELID value (HILINE+1) and the same processing of prior version Pointer Variable Lists takes place. The 'deleted' source line with the unique DELID variable attached is then placed in the SEV output file 306. (Note: The processing of a 'deleted' line involves only the updating of prior version Pointer Variable Lists. No reference to the deleted line will exist in the Pointer Variable List of the version of the source being stored.) The compare output file is then read again (FIG. 2A at 209) to retrieve the next relative record number and the actual changed line data.

Figure 4:
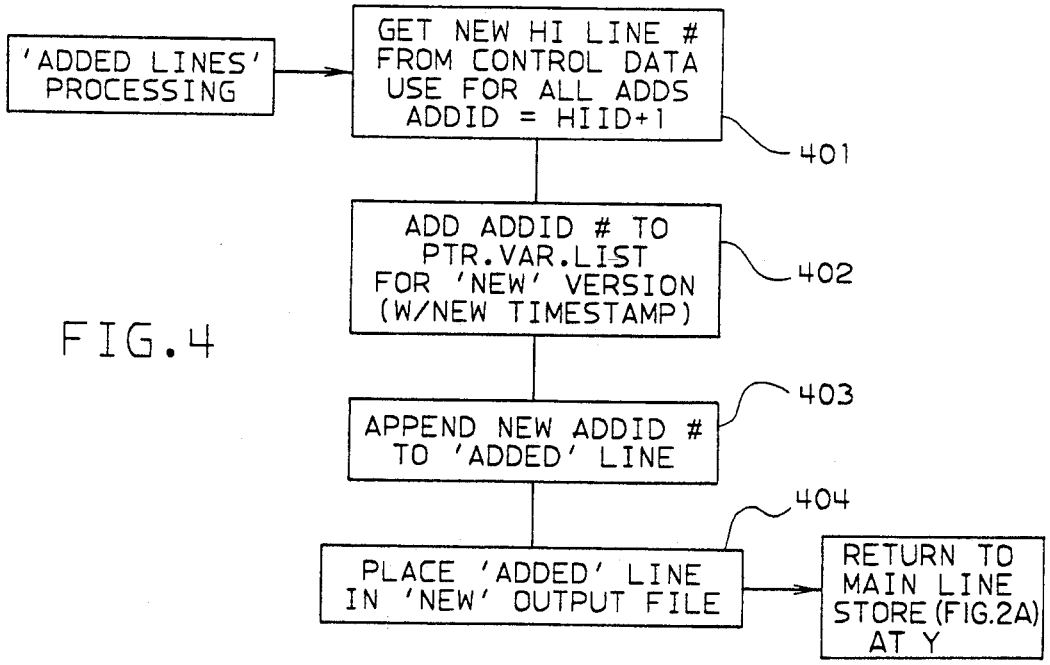
FIG. 4 is a flowchart illustrating ADD LINES processing.

If the compare data (FIG. 2B at 215) indicates an 'Added' line, (assumed the case if not "delete") processing is performed as indicated in FIG. 4. First, 401, a new HILINE number is retrieved from the HILINE value in the ECD Control Data Element where it is maintained. The HILINE value always reflects the 'last used' Line ID number. The HILINE number is incremented by one and this incremented number is placed in the ADDID variable. Next, 402, the ADDID variable will be placed in the Pointer Variable List for this new version being processed. This same value will be used to identify all added lines which were identified in the compare program output for this store operation. The ADDID variable is then appended 403 to the beginning of the source line identified in the compare program output. The added source line with the ADDID variable attached is then placed in the SEV output file 404. The compare output file is then read again (FIG. 2A at 209) to retrieve the next relative record number and the actual changed line data. When test 210 detects the end of the compare file, the remainder of the unchanged lines in the prior level file are copied to the SEV output file 216, 217.

As noted above, Base Level Change Detection is the SEV feature which records the version ID of the changed source version in the BLCD lists of all dependent versions. The remaining processing shown in FIG. 2B relates to BLCD.

At 218, a Scan is done of the Version Dependency chain as contained in the Version ID/Base ID data in the VCD Control Data Element to identify any source versions which are dependent on the version being processed. The scan ends 219 when the end of the dependency chain is reached. For each identified dependent version found 220 in the chain, the version ID of the version being processed in the BLCD list of that dependent version is recorded 221. The resulting BLCD list for each version will then contain a list of each version of the source which is potentially affected by the current version which was changed. (Note: The BLCD list is examined by the SEV Extract process each time the calling program requests a retrieve of a given source version. If a BLCD List exists, it is returned, along with a unique return code, to the calling program. This information serves to notify the calling program of any underlying (or related) version changes.) The last added ADDID or DELID value (the highest of the two values) is then placed (FIG. 2 at 222) in the HILINE value in the ECD Control Data Element so that subsequent processing will utilize the next sequential HILINE value. At the point the HILINE value processing is complete, 222, all necessary control data has been processed and all source lines have been placed in the proper order in the SEV output file. The address of the SEV output file is returned to the calling program 223.

The BLCD methodology described in detail above builds BLCD lists which are retained in the SEV VCD Control Data Element. This BLCD processing is executed as a sub-function in the SEV STORE process.

An alternative methodology is to initiate BLCD processing wholly as a sub-function of the SEV EXTRACT process rather than partly performed in the STORE process. This alternative would operate as follows:

There is no significant change to the SEV constructs except that the BLCD entry lists in the VCD Control Data Element would be replaced with a Version/Level Dependency list. Each dependency list entry would consist of a Version ID and its corresponding Modification level timestamp.

A version/level dependency entry is placed in the dependency list each time a version is stored as part of the SEV STORE operation whenever a new version is specified. This entry identifies the specific version and modification level (via its timestamp) from which the new version is derived. In addition, entries might also be entered via a dependency specification command.

As part of the EXTRACT operation, SEV processing would compare the timestamp value of each Version/Level dependency entry taken from the version dependency list of the version being extracted and compare this timestamp against the timestamp value of each modification level found in the relevant underlying or related versions. The relevant underlying or related versions are those versions identified in the dependency list of the extracted version (the versions upon which the extracted version is dependent).

Any timestamps in the relevant versions/levels which are 'higher' than the timestamp of the version/level being compared would indicate that the underlying or related version has been changed since the last time the version being extracted was accessed. Each identified changed version/level is built into a list which would be made available to the using application.

As in the former embodiment, if any underlying changed versions are identified, an automatic BLCD notification would be returned to the using application and the changed version list may be accessed.

The BLCD Reset operation would be implemented as either deleting a specified Version/Level Dependency entry or updating the specified entry with a higher timestamp. Deleting the entry would cause the version to no longer be identified as a relevant underlying version. Updating the entry with a timestamp equal to the timestamp of a higher (or the highest) underlying modification level would have the effect of continuing to maintain the dependency entry but the compare operation would be reset to only identify 'future' underlying changes.

Compare Process:

As noted above, SEV utilizes a standard compare process to compare the modified file (the updated file being stored) against the original version of that file. The only requirement of the compare process is that its output include a "difference" file.

The objective of the compare is to identify differences between the two files in the form of lines which have been either 'added' or 'deleted'. The compare process assigns reference values called relative line numbers in order to identify each line position within the file. Added and deleted lines (and the number of each) are then identified relative to where they are positioned within the file. This difference information is placed in a compare output file.

In this example, the relative line number in the compare output file references the prior level (merge) file. A process therefore, can access the compare output file and the prior level file to build a new merged file. Unchanged lines are copied from the prior level file and the identified added/deleted lines are built into a new resulting file in the appropriate order.

| Sample Compare Program Output | | |
| --- | --- | --- |
| Merge file: FILE.A | | Target file:FILE.B |
| Rel Line # | # of Dels. | # of Adds |
| C   000005 | | 000002 |
| LINEA - This line was added | | |
| LINEB - This line was added | | |
| C   000014 | 000001 | |
| LINEC - This line was deleted | | |
| C   000055 | 000001 | 000002 |
| LINEX - This line was deleted | | |
| LINEY - This line was added | | |
| LINEZ - This line was added | | |

This example indicates the following:

At line number '000005' in the file, 2 lines were added (LINEA and LINEB).

At line number '000014' in the file, 1 line was deleted (LINEC).

At line number '000055' in the file, 1 line was deleted (LINEX) and 2 lines were added (LINEY and LINEZ).

The SEV BLCD Reset Operation

Figure 5:
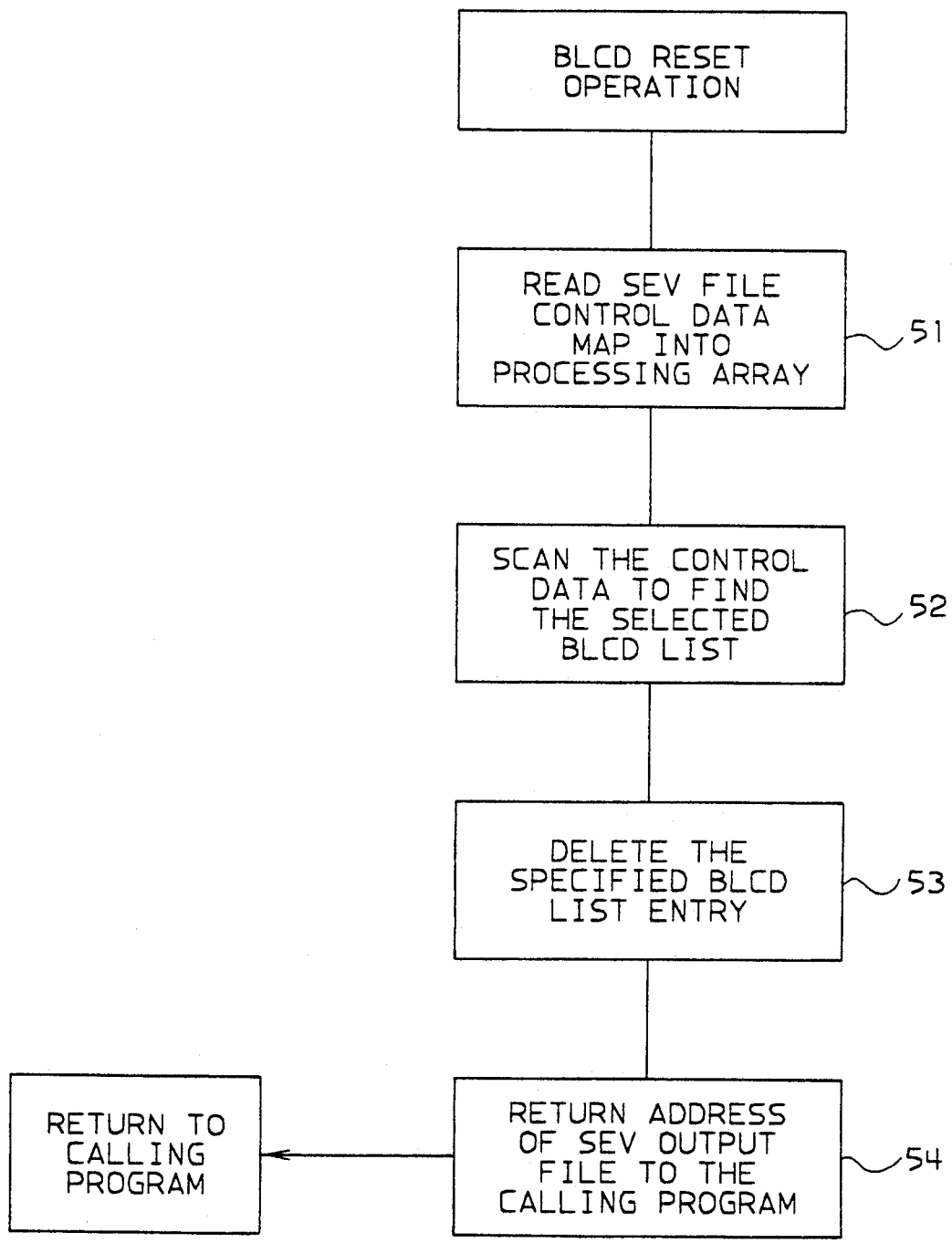
FIG. 5 is a flowchart illustrating Base Level Change Detection Reset operation.

The SEV BLCD Reset Operation shown in FIG. 5 is used to delete a BLCD List entry. First, 51, a selected SEV Entity (input file) is read. Then, the selected Version BLCD list is referenced 52 and the specified BLCD List entry is deleted 53. The address of the SEV output file is returned 54 to the calling program.

The SEV Erase Operation

Figure 6:
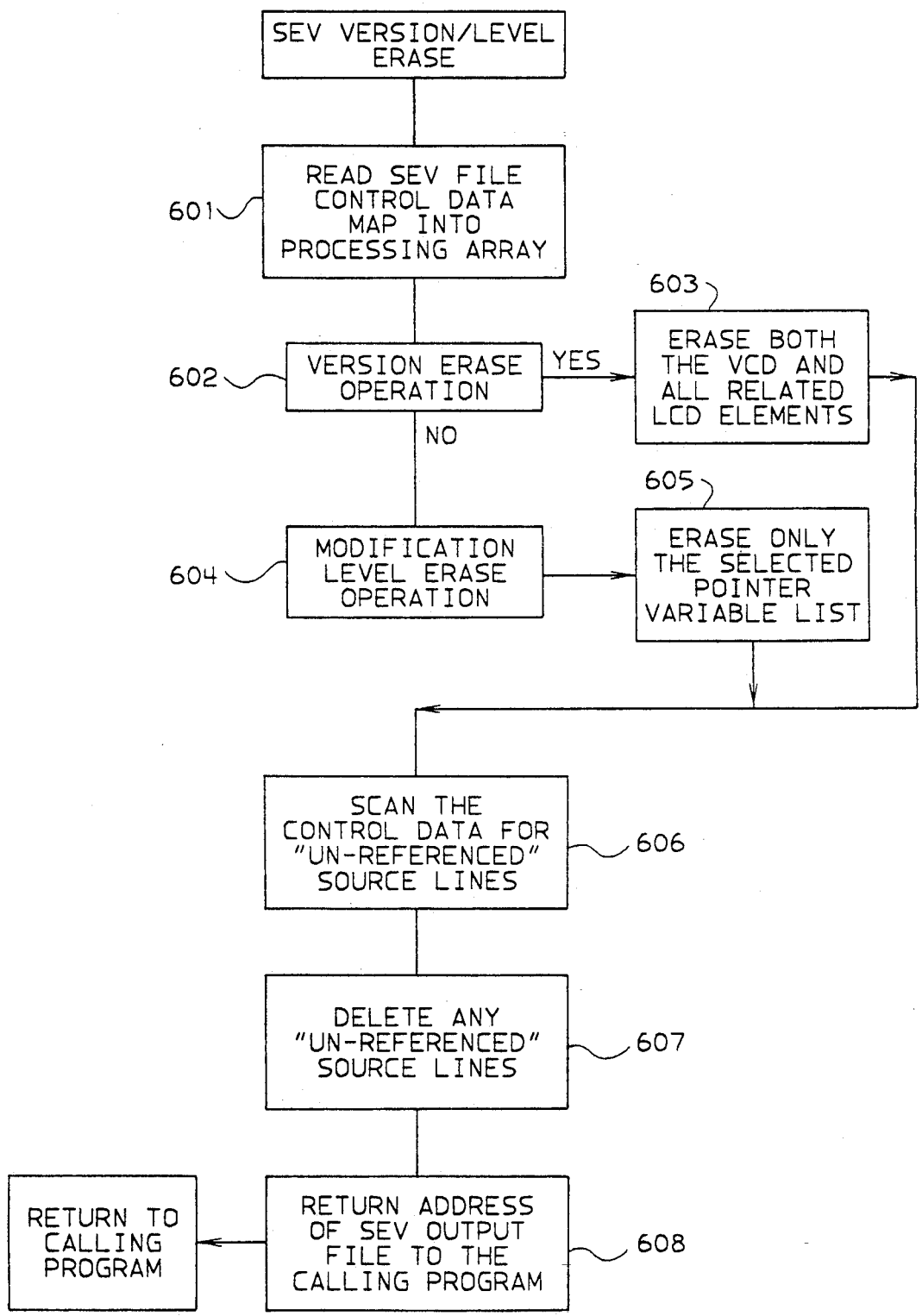
FIG. 6 is a flowchart illustrating the ERASE operation.

The SEV Erase Operation shown in FIG. 6 is used to erase an Existing version or modification level. First, 601, a selected SEV Entity (input file) is read. If a version erase is specified 602, both the Version Control Data (VCD) element and all related Level Control Data (LCD) elements are deleted 603. If a modification level erase is specified 604, only the Pointer Variable List in the specified Level Control Data (LCD) element is deleted 605. The Control data is then scanned 606 to determine if there are any 'unreferenced' source lines created as a result of the erase. If any are found, those unreferenced lines are deleted 607. The address of the SEV output file is returned 608 to the calling program.

The SEV PUTDATA Operation

Figure 7:
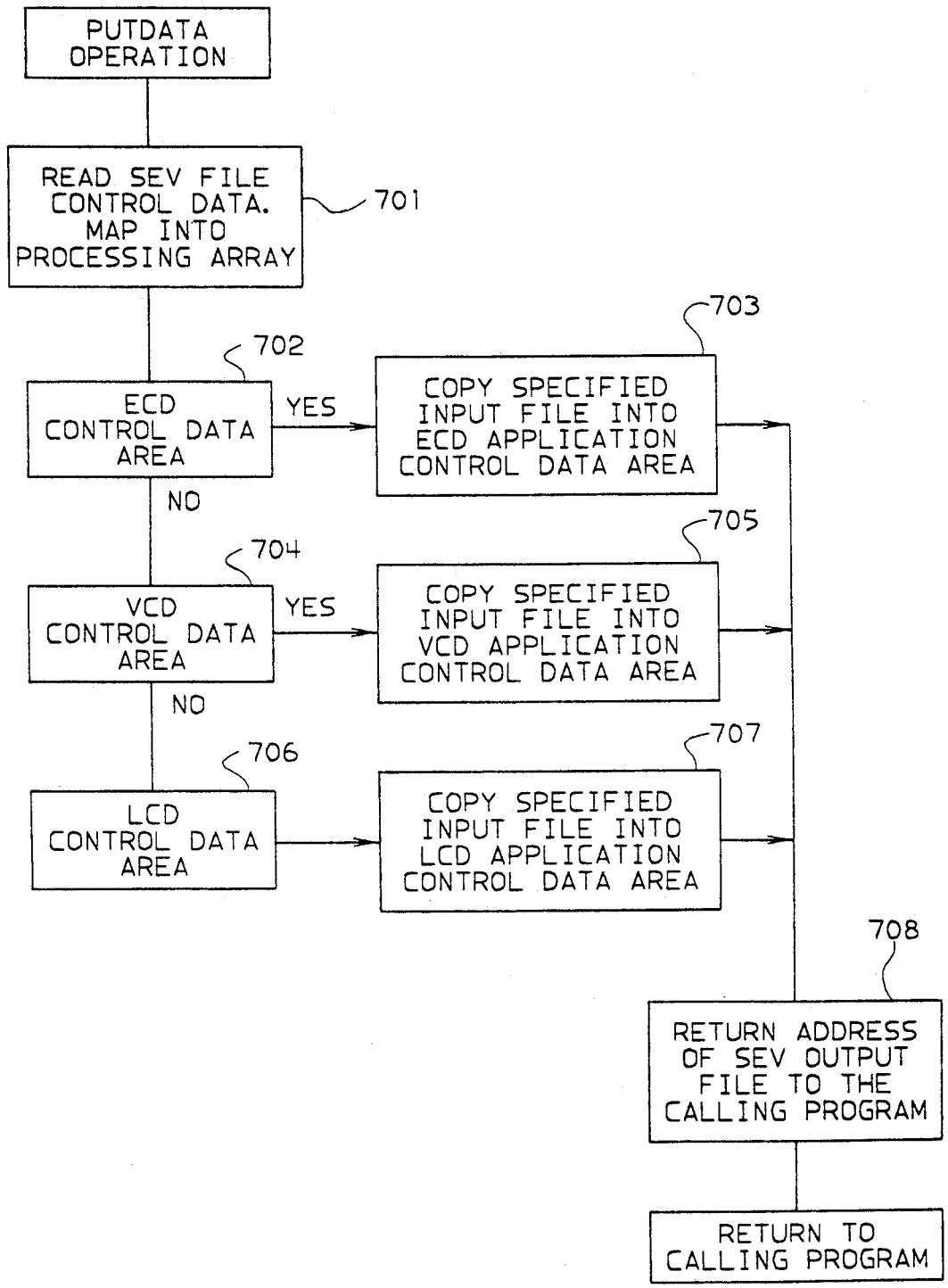
FIG. 7 is a flowchart illustrating the PUTDATA operation.

The SEV PUTDATA Operation shown in FIG. 7 is used to copy application-defined data from a specified input file, and record the data within the SEV entity at either the ECD, VCD or LCD control data areas. At 701, a selected SEV entity (input file) is read. Depending on whether the request specified ECD (702), VCD (704) or LCD (706), the input file is copied into the appropriate control data area (703, 705 or 707). The address of the rebuilt SEV output program is returned to the calling program (708).

The SEV GETDATA Operation

Figure 8:
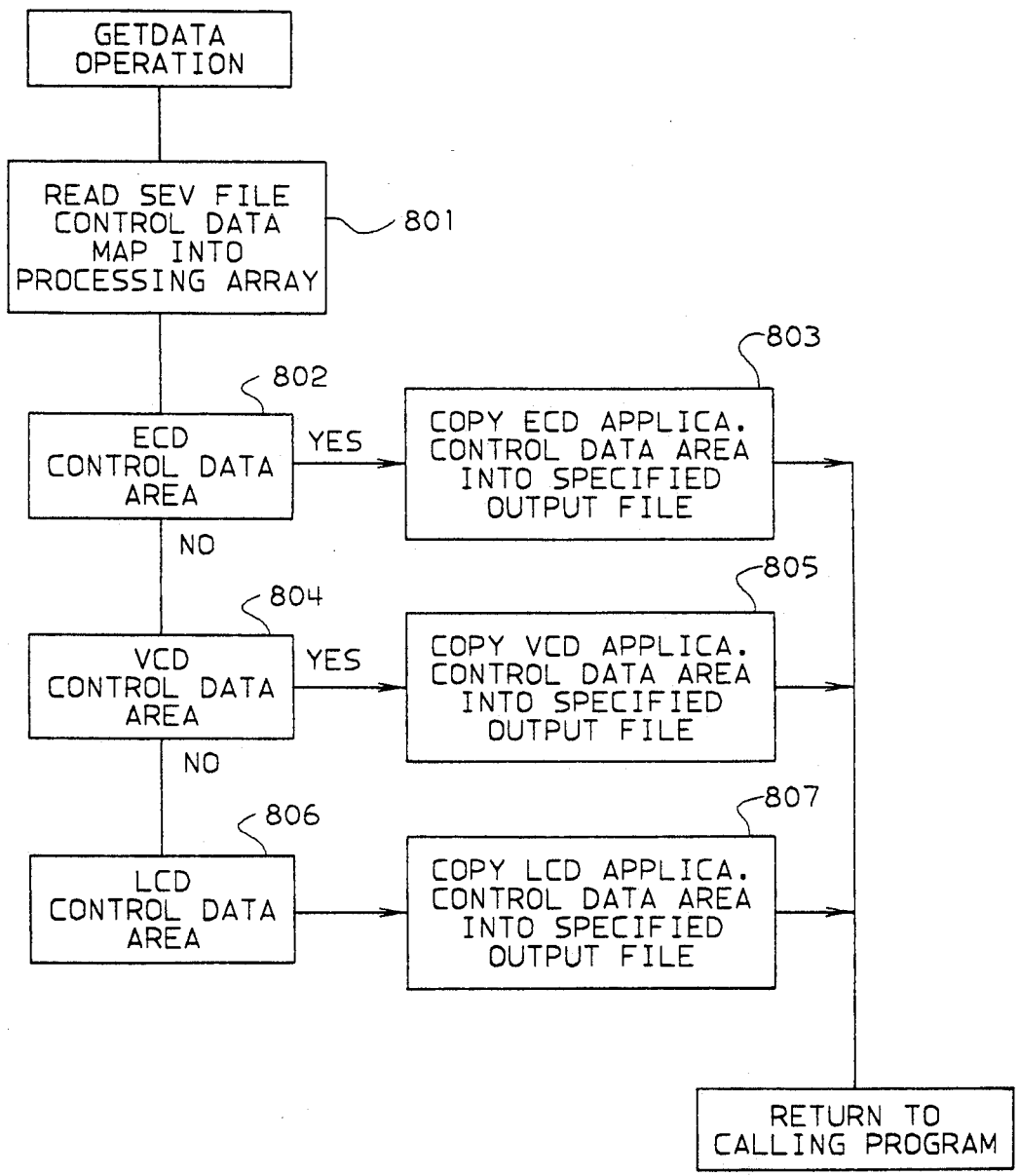
FIG. 8 is a flowchart illustrating the GETDATA operation.

The SEV GETDATA Operation shown in FIG. 8 is used to retrieve application-defined data from either the ECD, VCD or LCD control data area, and write the data to a specified output file. First, 801, a selected SEV entity (input file) is read. Depending on whether the ECD (802), VCD (804) or LCD (806) was specified, the appropriate control data is copied (803, 805 or 807) to the specified output file. Return is then made to the calling program.

The SEV LOCK ON/OFF Operation

Figure 9:
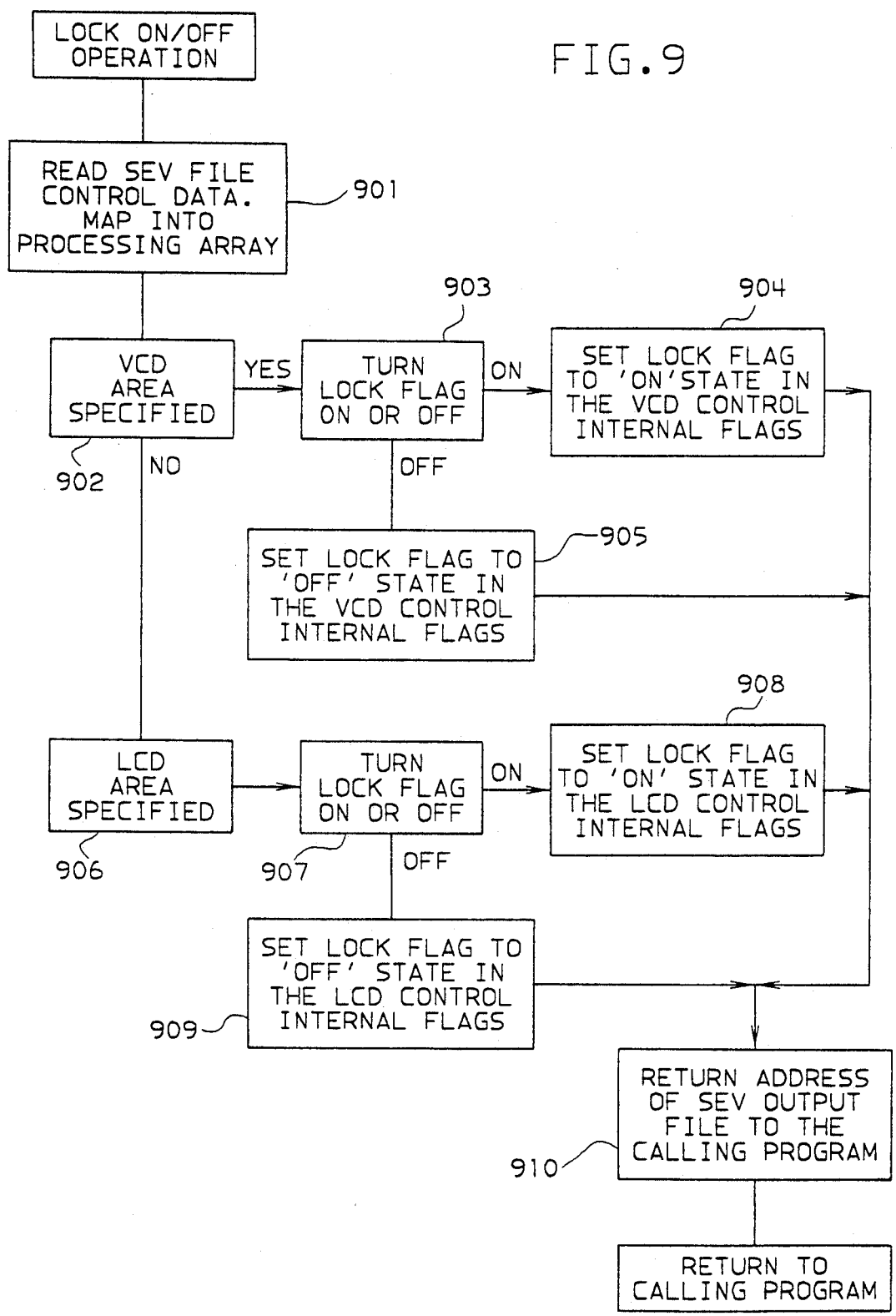
FIG. 9 is a flowchart illustrating the LOCK ON/OFF operation.

The SEV LOCK ON/OFF Operation shown in FIG. 9 is used to set the on/off "state" of the SEV LOCK flag in either the VCD or LCD control data area of the SEV entity. First, 901, a selected SEV entity (input file) is read. Depending on whether the VCD (902) or LCD (906) was specified, and whether the lock is to be set "on" (904, 908) or "off" (905, 909), (as indicated by tests 903 and 907) the appropriate processing is performed. The address of the rebuilt SEV output file is returned to the calling program (910).

EXAMPLES

Figure 11:
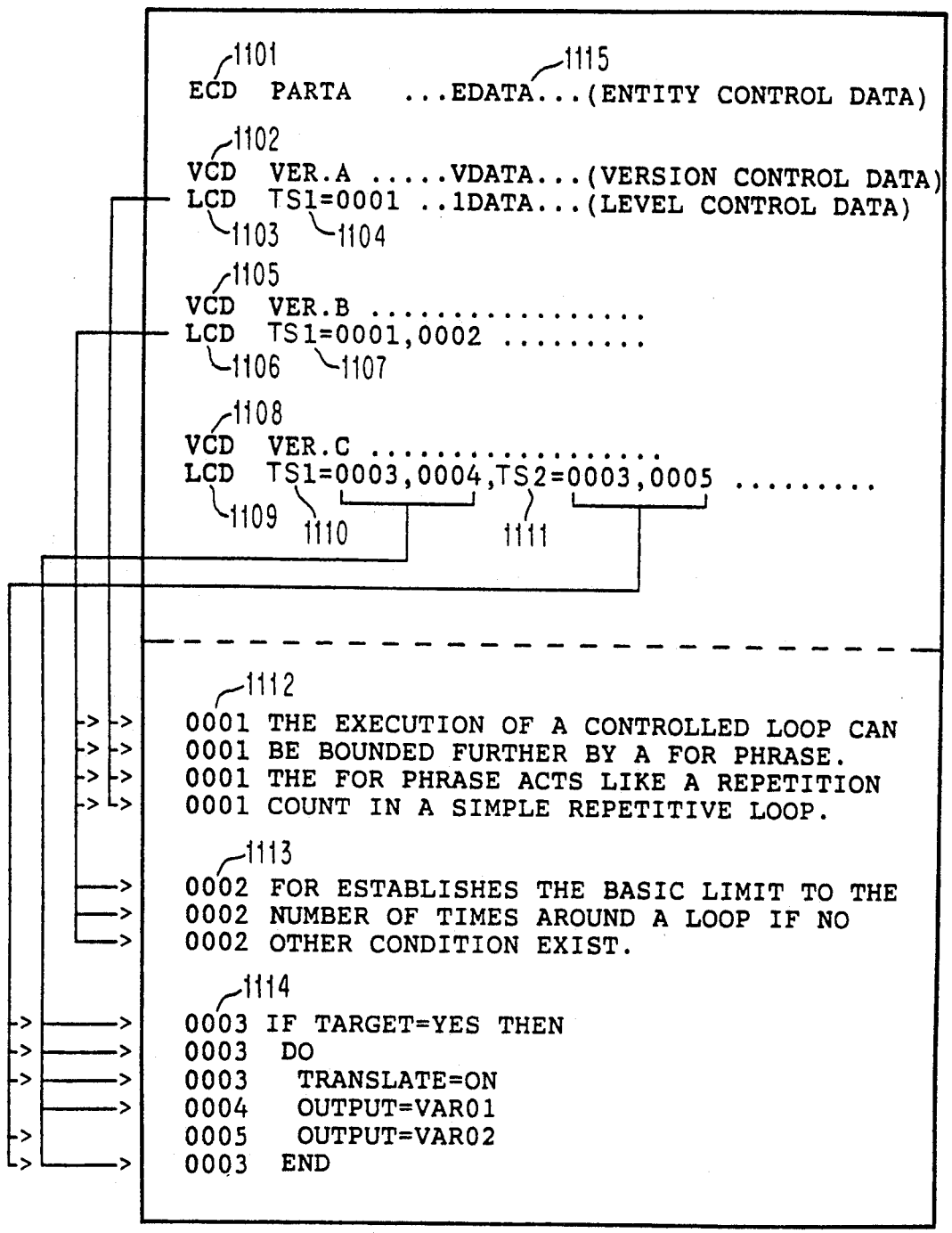
FIG. 11 is a conceptual view of a SEV file, showing sample data and control elements.

FIG. 11 depicts a conceptual view of a SEV Entity which includes examples of the SEV Control Data Elements. Note that the entire entity is contained in a single encapsulated form. Note also that the pointer variables "0001", "0002", etc., assigned sequentially as noted in STORE processing (FIG. 2), provide a complete history of incremental source change activity identified in the historical order in which the changes occurred.

1. Item 1101 depicts the ECD element (defined abstractly in FIG. 10 at 1001) in which, for example, an application defined name 'PARTA' is recorded.

2. Item 1102 depicts the VCD element in which, for example, an application defined version specification (VER.A) is recorded.

3. Item 1103 depicts the LCD element in which, for example, a timestamped pointer variable list is recorded (item 1104) representing the version specified in the corresponding VCD element (item 1102).

4. Item 1105 depicts another VCD element in which, for example, an application defined version specification (VER.B) is recorded.

5. Item 1106 depicts the LCD element in which, for example, a timestamped pointer variable list is recorded (item 1107) representing the version specified in the corresponding VCD element (item 1105).

6. Item 1108 depicts another VCD element in which, for example, an application defined version specification (VER.C.) is recorded.

7. Item 1109 depicts the LCD element in which, for example, two timestamped pointer variable lists are recorded (items 1110 and 1111) representing two modification levels of the version specified in the corresponding VCD element (item 1108).

8. Item 1112 depicts a grouping of source lines prefixed with the pointer variable '0001'.

9. Item 1113 depicts a second grouping of source lines prefixed with the pointer variable '0002'.

10. Item 1114 depicts a third grouping of source lines prefixed with the pointer variables '0003' and '0004'.

11. Item 1115 depicts application defined data that can be recorded within the structure of the three Control Data Elements.

Note that the Pointer Variable Lists associated with each version specification contain the proper pointer variables to identify the source lines which, when extracted, collectively constitute the correct representation of the source.

SEV Pointer Variable Processing Logic Scenario

Figure 12:
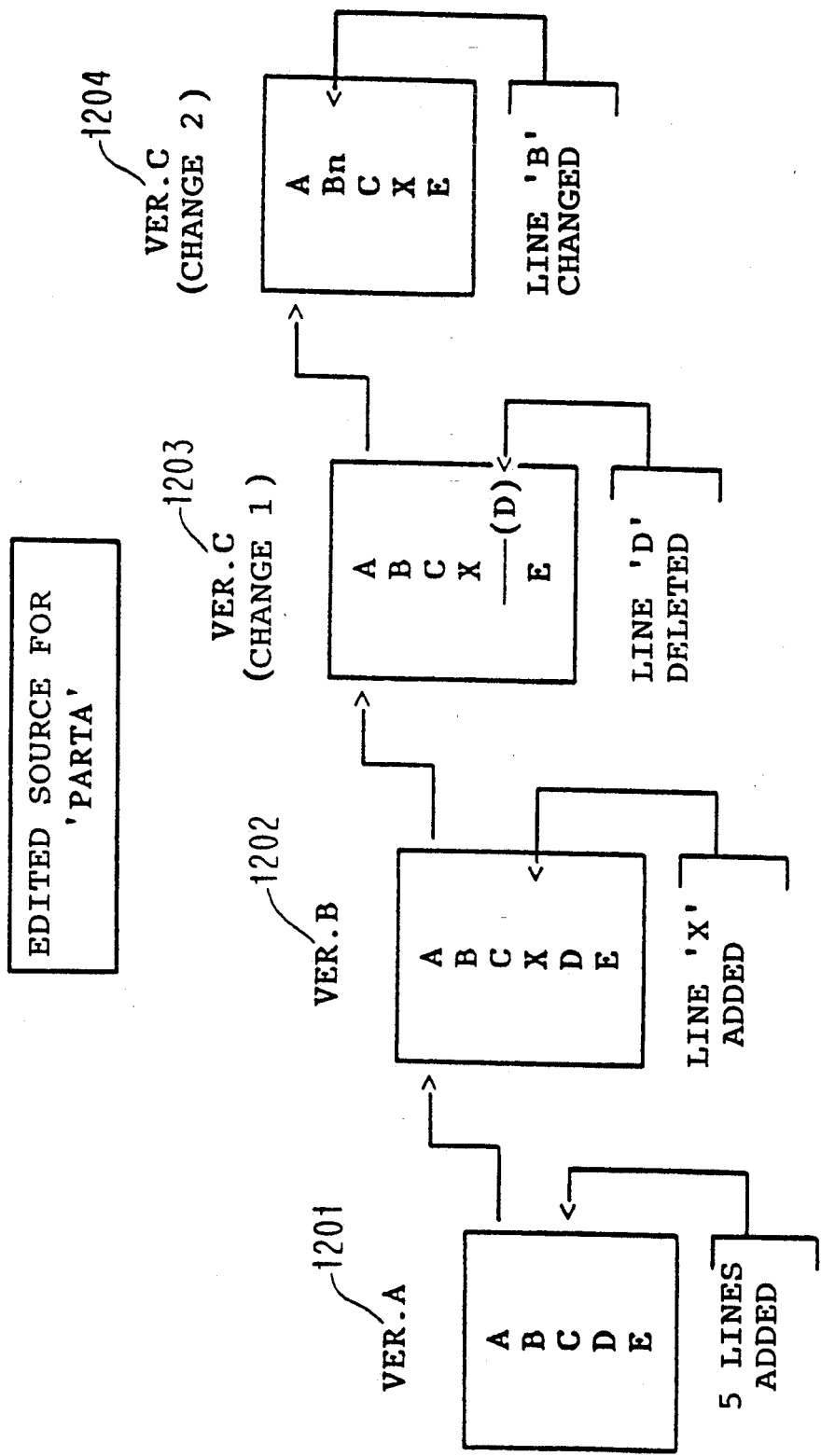
FIG. 12 is a block diagram illustrating an example of an iterative series of modifications to a SEV file.

The following four scenarios depict the logic steps taken to process the initial creation of a source file and subsequent changes to that file. FIG. 12 shows what the edited file would look like to the end user and FIGS. 13-16 show what the SEV file would look like as changes to the file are made.

The reference numbers associated with each step reference the flow diagrams contained in FIGS. 1-6.

VER.A

Figure 13:
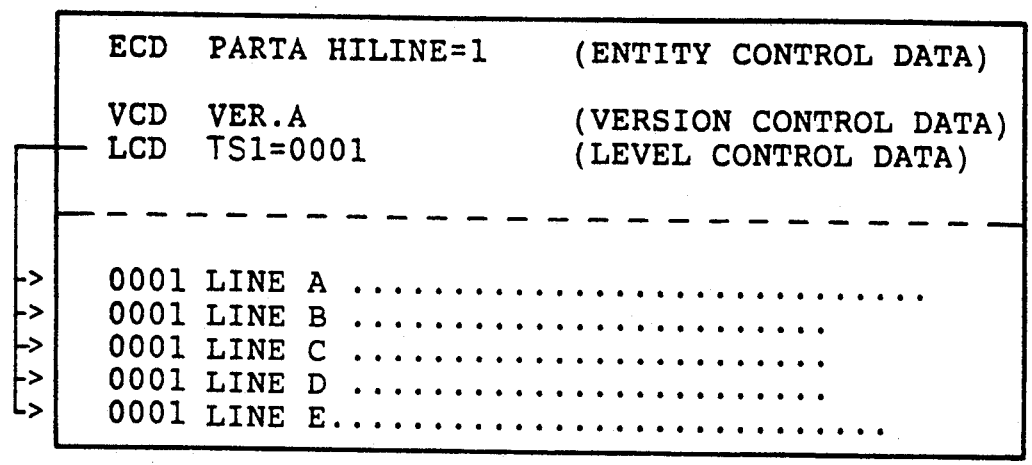
FIG. 13 illustrates a SEV entity upon storing an example version A.

Initial store of a new data entity (FIG. 12 at 1201). VER.A—A new SEV Entity is initially created with the part name contained in the ECD element, the version 'VER.A' is placed in the VCD element, and the timestamped pointer variable list is placed in the LCD element. FIG. 13 illustrates the resulting SEV entity when the edited source is stored.

201 This is a new SEV entity.
202 The initial pointer variable is set to '1'.
203 The variable '1' is placed in a newly created Pointer Variable List for VER.A with an attached timestamp (ts1).
204 The initial pointer variable '1' is appended to each record in the file.
205 Each record is placed in the output file.
222 The ADDID value '1' is placed in the HILINE value field in the control data.
223 The address of the SEV file is returned to the calling program.

VER.B

Figure 14:
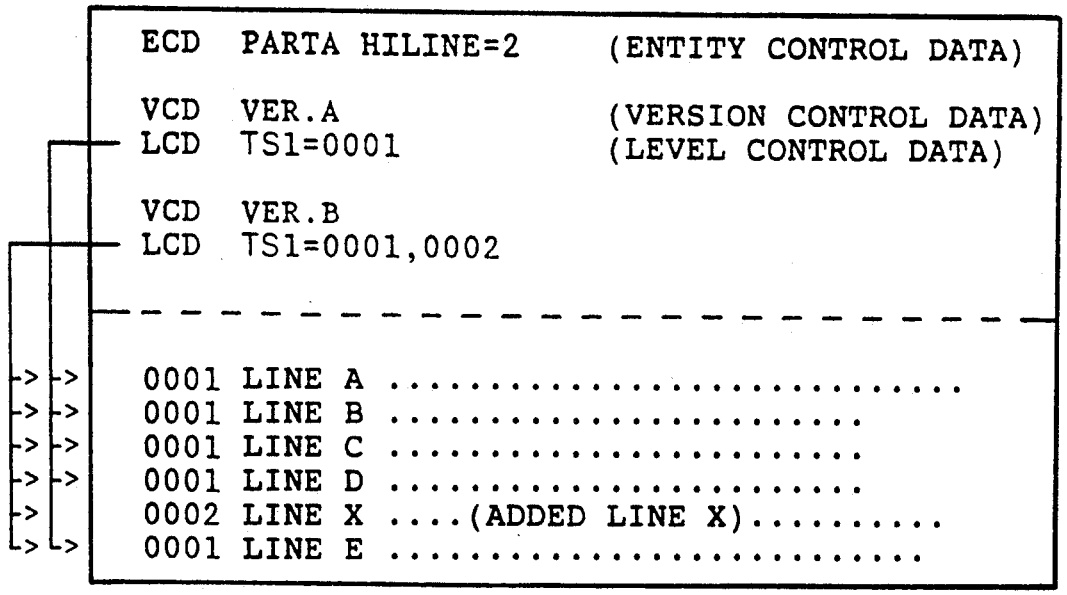
FIG. 14 illustrates a SEV entity upon storing an example version B.

Version B was derived from version A and the line 'X' was added to the edited file (FIG. 12 at 1202). A new VCD/LCD Control element pair is created identifying the new version 'VER.B' and a new timestamped pointer variable table. FIG. 14 illustrates the resulting SEV entity when the edited source is stored.

201 This is an existing SEV entity.
206 Get the Prior Level version (VER.A) for compare.
207 The updated file for VER.B is compared against the prior version (VER.A).
208 The compare process creates the compare file and identifies line X as an added line (with its proper relative record number).
209 The compare file is read and the relative record number and the change (add/delete) information is retrieved.
210 EOF test for compare file.
211 The prior level file is read and a line count of the number of lines read is maintained.
212 Does the line count equal the relative record number.
213 No—Unchanged lines are placed in the output file (until the line count equals the relative record number).
215 The compare output file indicates an 'added' record.
401 The HILINE number is retrieved from the control data and incremented by '1'. The Add ID value (ADDID) will equal 2. The ADDID value '2' is assigned as the pointer variable representing line X.
402 The ADDID value '2' is placed in a newly created Pointer Variable List for VER.B (which was derived from the VER.A Pointer Variable List) and given a new timestamp (ts1).
403 The ADDID value '2' is appended to Line X.
404 Line X is placed in the output file.
209 The compare file is read again and an end of file (EOF) indicator is returned.
216, 217 The remainder of the records in the input file are placed in the output file (until EOF from the Prior Level file).
218 Scan the version dependency chain (BLCD test).
219 End of dependency scan (none found).
222 The ADDID value '2' is placed in HILINE number field in the control data.
223 The address of the SEV file is returned to the calling program.

VER.C (Modification (Change) level 1)

Version C was derived from version B and the line 'D' was deleted from the edited file (FIG. 12 at 1203). VER.C (Modification Level 1)—A new VCD/LCD Control element pair is created identifying the new version 'VER.C' and a new timestamped pointer variable list. FIG. 15 illustrates the resulting SEV entity when the edited source is stored.

201 This is an existing SEV entity.
206 Get the Prior Level version (VER.A) for compare.
207 The updated file for VER.C is compared to the prior version (VER.B).
208 The compare process creates the compare file and identifies Line D as a deleted line (with its proper relative record number).
209 The compare file is read and the relative record number and the change (add/delete) information is retrieved.
210 EOF test for compare file.
211 The prior level file is read and a line count of the number of lines read is maintained.
212 Does the line count equal the relative record number.
213 No - Unchanged lines are placed in the output file (until the line count equals the relative record number).
214 The compare output file indicates a 'deleted' record.
301 The HILINE number '2' is retrieved from the control data and incremented by '1'. The Delete ID value (DELID) will equal 3. The DELID value '3' is assigned as the pointer variable representing Line D.
302 The previous pointer variable for line D '1' is retained.
303 Because line D received a new pointer variable '3', all prior pointer variable lists are scanned for the value of its previous pointer variable '1'. The pointer variable lists for VER.A and VER.B are found to contain a reference to pointer variable 1, the new DELID value '3' is added to the pointer variable lists for VER.A and VER.B.
304 The DELID value '3' is appended to Line D.
305 the DELID value '3' is placed in the Control Data HILINE number.
306 Line D is placed in the output file.
209 The compare file is read again and an end of file (EOF) indicator is returned.
216, 217 The remainder of the records in the input are placed in the output file (until EOF from the Prior Level file).

218 Scan the version dependency chain (BLCD test).
219 End of dependency scan (none found).
222 The DELID value '3' is placed in the HILINE number in the control data.
223 The address of the SEV file is returned to the calling program.

VER.C (Modification (Change) level 2)

Version C(2) was derived from version C(1) and the line 'B' was changed to 'Bn' in the edited file (FIG. 12 at 1204). VER.C (Modification Level 2)—A new timestamped pointer variable list is appended to the existing LCD element. FIG. 16 illustrates the resulting SEV entity when the edited source is stored.

201 This is an existing SEV entity.
206 Get the Prior Level version (VER.A) for compare.
207 The updated file for VER.C(2) is compared against the prior version VER.C(1).
208 The compare process created the output file and identified Line B as a deleted line (with its proper relative record number) and Line Bn as an added line (with its proper relative record number).
209 The compare file is read and the 'first' relative record number and the change (add/delete) information is retrieved.
210 EOF test for compare file.
211 The prior level file is read and a line count of the number of lines read is maintained.
212 Does the line count equal the relative record number.
213 No—Unchanged lines are placed in the output file (until the line count equals the relative record number).
214 The compare file output indicates a deleted record.
301 The HILINE number '3' is retrieved from the control data and incremented by 1. The Delete ID value (DELID) will equal 4. The DELID value '4' is assigned as the Pointer Variable representing Line B.
302 The previous pointer variable for line B '1' is retained.
303 Because line B received a new pointer variable '4', all prior pointer variable lists are scanned for the value of its previous pointer variable '1'. The pointer variable lists for VER.A, VER.B and VER.C(1) are found to contain a reference to pointer variable 1, the new DELID value '4' is added to the pointer variable lists for VER.A, VER.B and VER.C(1).
304 The DELID value '4' is appended to Line B.
305 The DELID value '4' is placed in the Control Data HILINE number.
306 Line B is placed in the output file.
209 The compare file is read again and the 'next' relative record number and the change (add/delete) information is retrieved.
210 EOF test for compare file.
211 The prior level file is read and a line count of the number of lines read is maintained.
212 Does the line count equal the relative record number.
213 No—Unchanged lines are placed in the output file until the count equals the relative record number.
215 The compare file output indicates an added record.
401 The HILINE number '4', is retrieved from the control data and incremented by 1. The Add ID value (ADDID) value will equal 5. The ADDID value '5' is assigned as the Pointer Variable representing Line Bn.
402 The ADDID value '5' is placed in a newly created Pointer Variable list for VER.C(2) (which was derived from the original VER.C(1) Pointer Variable List) and given a new timestamp (ts2).
403 The ADDID value '5' is appended to line Bn.
404 Line Bn is placed in the output file.
209 The Compare file is read again and an EOF indicator is returned.
216,217 The remainder of the records in the input are placed in the output file (until EOF from the Prior Level file).
218 Scan the version dependency chain (BLCD test).
219 End of dependency scan (none found).
222 The last ID value '5' (the ADDID) is placed in the HILINE number in the control data.
223 The address of the SEV file is returned to the calling program.

While the invention has been described with reference to preferred embodiments thereof, it will be understood by those skilled in the art that various changes in form and details may be made without departing from the scope of the invention.

What is claimed is:

1. In a programming code development system comprising a CPU, system storage comprising main and auxiliary storage, an application program, and versions of source data in said system storage, said versions having individual data items, an apparatus for providing version management for said source data comprising:

I) a data repository, in said system storage, comprising
   a) a control data element comprising one or more version/level control data field pairs, each of said data field pairs uniquely identifying a level of a version of source code and comprising:
      i) a version control data element comprising a version identifier identifying one of said versions of source data;
      ii) a level control data element comprising a pointer variable field having one or more pointer variables; and
   b) one or more data item data elements, each of said data item data elements comprising a prefix field and a data field, said prefix field comprising a single one of said one or more pointer variables, said data field comprising one of said individual data items wherein more than one of said prefix fields have pointer variables in common;

II) an extract means, invocable by said application program, for extracting a specified version level of said versions of source data from said data repository, said extract means comprising Read Control means for obtaining said control data element, and Read Data means for constructing a copy of said specified version level by reading each of said data item data elements and selectively placing a specific one of said data item data elements in said copy if the pointer variable in the prefix area of said specific item data element matches one of said one or more pointer variables in the level control data element paired with the version control data element having the version identifier identifying said specified version.

2. The apparatus of claim 1 in which said version control data element further comprises a version locking flag, and said level control data element further comprises a level locking flag, said apparatus also further comprising a LOCKON/LOCKOFF means, invokable by said application program, for setting and resetting said version locking flag and said level locking flag.

3. The apparatus of claim 2 further comprising:
   a) PUT means, invokable by said application program, for copying application-defined data from an input file to said control data element; and
   b) GET means, invokable by said application program, for retrieving said application-defined data from said control data element, and placing said application-defined data in a specified output file.

4. The apparatus of claim 1 further comprising store means, invocable by said application program, for storing a changed version of said specified version level into said data repository, and in which said control data element further comprises an identity control element, comprising a highest used pointer variable identifier said highest used pointer variable identifier being updated by said store means on said storing and used by said store means in assigning new pointer variables for said data item data elements.

5. The apparatus of claim 4 in which said store means comprises:
   a) compare means for comparing said changed version with said specified version to produce a computer output file;
   b) deleted line processing means for updating said data repository in response to an indication of a deleted line in said compare output file; and
   c) added line processing means for updating said data repository in response to an indication of an added line in said compare output file.

6. The apparatus of claim 4 in which said version control data element further comprises a base version identifier identifying a base version of said source data upon which said one of said version is based, and a base level change detection (BLCD) list identifying one or more dependent version of said source data potentially affected by a change, in which said store means further comprises BLCD list update means for updating said BLCD list when storing said changed version, and in which said extract means further comprises detection means for detecting said change, by inspecting said BLCD list, when extracting one of said one or more dependent versions from said data repository and returning a notification to said application program.

7. In a programming code development system comprising versions of source data having individual data items, a method for providing version management for said source data comprising the steps of:
   a) creating a first version of said source data in a data repository, said first version of said source data comprising a first version control data element and a first set of one or more data item data elements, said first version control data element comprising base level change detection (BLCD) list means for identifying one or more dependent versions of said source data potentially affected by a change to said first version of said source data;
   b) creating a second version of said source data, said second version comprising a second version control data element and a second set of one or more data item data elements, said second set including a first subset of said first set so that said second version is dependent on said first version said second version control data element comprising a base version identifier identifying said first version of said source data as being a base version upon which said second version is dependent;
   c) modifying a second subset of said first set of individual data items of said first version and storing a resultant modified, first version into said data repository; and
   d) scanning all base version identifiers to determine all versions of said source data dependent upon said first version and identifying said second version upon scanning said base version identifier in said second version control data element;
   e) placing an indicator of said first version in said BLCD list means of said second version control data element;
   f) automatically notifying an accessor, on subsequently accessing said second version and finding said indicator of said first version in said BLCD list means of said second version, of the modifying of said first version.

* * * * *